Patented Mar. 15, 1927.

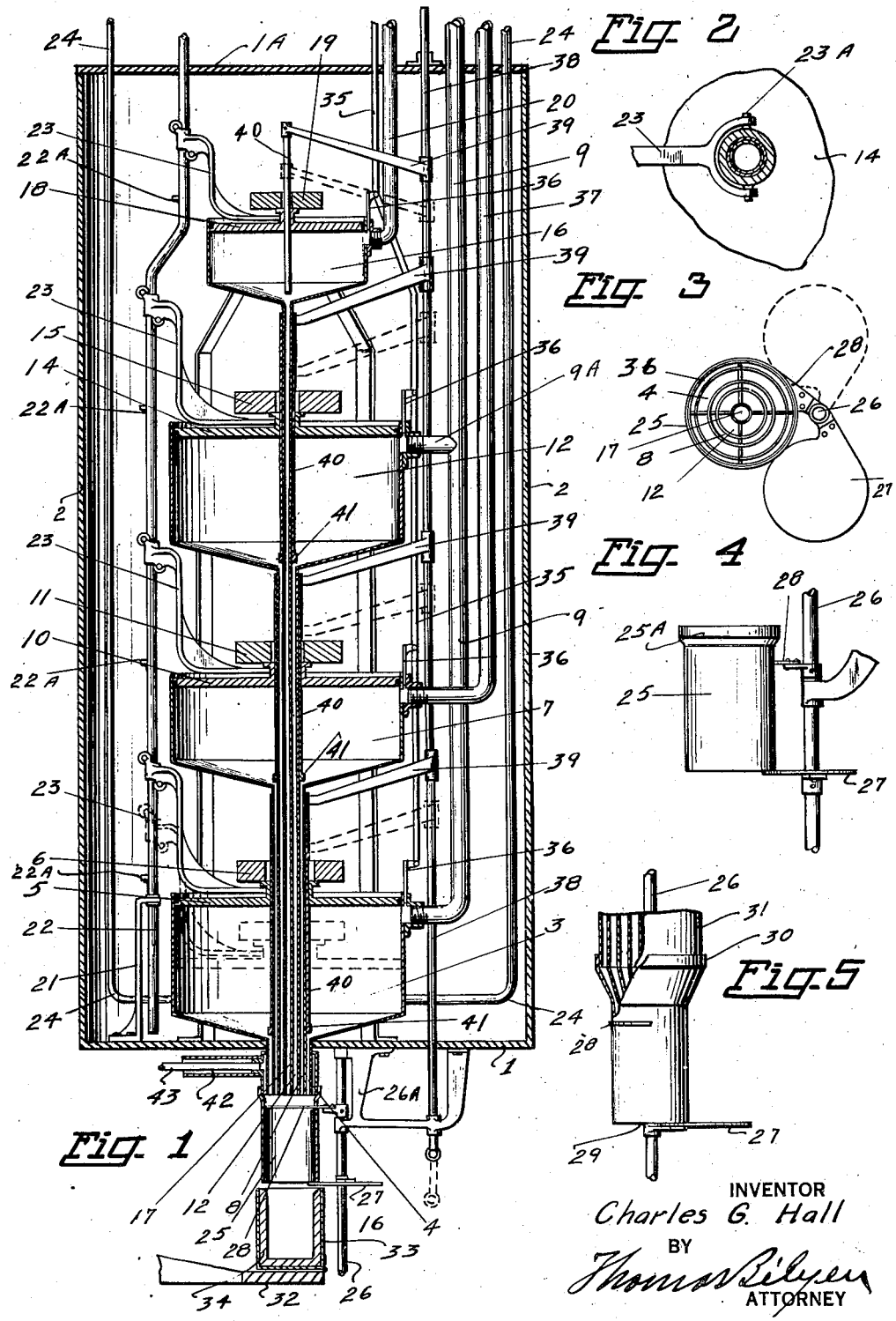

1,621,010

UNITED STATES PATENT OFFICE.

CHARLES G. HALL, OF PORTLAND, OREGON, ASSIGNOR TO NOVELTY FOOD CORPORATION, OF BOISE, IDAHO, A CORPORATION OF IDAHO.

CONFECTION-FILLING MACHINE.

Application filed May 20, 1924. Serial No. 714,597.

My invention is for use in filling a confection container made of edible materials, wherein stratified cylindrical layers of the confection are deposited within the confection container. The materials are placed within containers having outlets therefrom permitting the materials under pressure to be deposited therefrom into the confection containers that are placed at the point of outlet of the materials from the confection filler machine. Means are also provided for the easy access of the materials into the device and to stop the flow of materials and the filling of each container.

I attain these objects by mechanism illustrated in the accompanying drawings in which:

Fig. 1 is a sectional side elevation of the device made to show the construction of the same in detail.

Fig. 2 is a partial fragmentary sectional top elevation.

Fig. 3 is a top elevation of the mechanism employed in stopping the flow of material and cutting the same into required lengths to fill the container.

Fig. 4 is a partial side elevation of the cutting-off mechanism shown detached from the machine.

Fig. 5 shows a means for filling a container of smaller dimension than that illustrated in Fig. 1.

Like reference characters refer to like parts throughout the different views.

The device is made of rigid materials having a base 1, a top member 1ª and a closure shell 2 connecting the base and the top member which may be covered with an insulating material to better control the working temperatures within the enclosed space. A cylindrical hopper 3 having a sloping bottom and terminating in a restricted outlet 4 is used for the maintaining of filler confection materials such as ice cream and the like and having a piston like member 5 with superimposed weights 6 attached for the forcing of the filler materials through the restricted outlet and into the confection container. The member 5 is made to fit a working fit into the inner surface of the member 3 so as to create a pressure therein due to the superimposed weight 6, this is necessary because of the low plasticity of the confection filler material. Because of my confection being made of a series of stratified cylindrical layers my confection filling device is so made as to deposit the filler materials in stratified layers; this is accomplished by having hopper like containers located, one above the other, and having restricted openings leading therefrom and each arranged to permit the deposit of the contents within the cylindrical layer to be deposited from the next hopper below. 7 is a hopper having a sloping bottom and having a restricted outlet 8. Operating within the hopper 7 is a piston like member 10 and, also having a superimposed weight 11 for creating a pressure within the hopper 7. 12 is also a hopper like container and having a restricted outlet 13 leading therefrom. Superimposed above the hopper and working in conjunction therewith is also a piston like member 14 and supporting weights 15. 16 is also a hopper member having an outlet 17 leading therefrom and having a piston like member 18 weighted with weights 19. In order to replenish the supply within the hopper like containers inlet pipes 9, 9ª and 37 and 20 are provided which have cut off valves 36 operating at the point of discharge into the hopper containers. These valves are each connected to the valve stem 35 which may be operated manually or by other suitable means. Bracket 21 is secured to the base 1 and through which the stem 22 passes and is held at the upper end by passing through the closure 1ª. Slidably attached to the stem are arms 23 having forked terminals 23ª for engagement about the neck of the piston like members, and as the materials are taken from the hoppers these arms will progress down the stem, and when it is desired to replenish the materials within the hoppers the stem 22 is raised until the projection 22ª contacts with the under side of the arm 23 thus raising the same to the upper end of the hopper, while in this raised position the valves 36 are opened and the filler materials are permitted to enter the hoppers beneath the piston like members until the desired amount is secured, the valves are then closed and the stem 22 is lowered at which time the filling may then proceed. Cooling pipes 24 are permitted to enter the chamber between the shell and the hopper members for the purpose of regulating the temperature surrounding the hopper members.

Confection containers, that have been previously made, upon a machine for making confections and the like, application for patent is filed May 20, 1924, Serial Number 714,598, are placed within cups 33 that are passed beneath the discharge from the hoppers. A cutting off and filling chute 25 is provided that has a series of guides corresponding to the outlets leading from the hopper. This member has a bell shaped upper end that encases the outlet so that all of the openings register with the corresponding openings leading thereto. Journaled about shaft 26, which is held within bracket 26$^a$ are the cutting devices 27 and 28 that operate through slots within member 25. The distance between these cutting members determines the length of the filler materials that will be deposited within the confection containers and act at the same time as a stop to prevent an excess of material flowing from the hoppers. If a smaller confection is required a tapered feeding and cutting mechanism as shown in Fig. 5 may be employed. In the event that it should be found desirable to heat the outside layer of filler material, or to reduce the temperature, for any reason a jacket chamber, 42 is provided and which is supplied with a temperature control pipe 43. I have provided a positive feeding mechanism for the materials in the hopper by a feed rod 38 having attached thereto a series of arms 39 which are connected to plungers 40 having a ring at their lower extremity 41 which forms a close working fit between the cylindrical walls for the outlet of materials from the hoppers, the stroke of these plungers being regulated to the length of the material to be placed in the confection container to be filled.

Having thus described my invention I wish to make the following claims, therefor—

1. A confection filling machine, comprising a base, an enclosure shell disposed on said base, and a top for said shell, a series of hoppers mounted on said base, one above the other, and having extended outlets concentrically disposed, a weighted piston for each hopper, means for cutting to length the completed assembled cylindrical layers.

2. A confection filling machine, comprising a base, a topped closure shell mounted on said base, a series of hoppers mounted on said base and within said shell, one above the other, extended outlets for said hoppers concentrically disposed, means mounted on the lower part of said concentric outlets, adapted to measure a predetermined amount of material from said hoppers, and means within said hoppers for forcing the material contained therein into said outlets.

3. A confection filling machine, comprising a base, a shell closure supported on said base, a top for said shell closure, a series of hoppers disposed in storied arrangement upon said base and within said shell closure, and adapted to the retention of confection filler material, concentrical cylindrical outlets disposed from said hoppers, and adapted to deliver concentrical cylindrical confection, means disposed on said outlets to measure out a predetermined amount of confection material, means within said hoppers adapted to force the confection material into said outlets, plungers slidably maintained within said outlets and adapted to force the material therein contained a predetermined distance, and means to regulate the temperature adjacent the hoppers.

4. A confection filling machine, comprising a series of hoppers having sloping bottoms arranged one above the other, and mounted upon a base, a shell closure mounted on said base and disposed about said hoppers, extended cylindrical outlets, concentrically disposed centrally from the sloping bottoms of said hoppers, means for forcing the material within said hoppers through said outlets, a means for maintaining a pressure within the hoppers, means for maintaining a desired temperature in said hoppers disposed adjacent said hoppers, and means for cutting the material discharged from said hoppers to a required length.

CHARLES G. HALL.